(12) United States Patent
Chapanar et al.

(10) Patent No.: US 12,431,758 B2
(45) Date of Patent: Sep. 30, 2025

(54) ELECTRIC DRIVE UNIT THAT INCLUDES A BAFFLE

(71) Applicant: Schaeffler Technologies AG & Co. KG, Herzogenaurach (DE)

(72) Inventors: Christopher Chapanar, Massillon, OH (US); David Kinion, Cuyahoga Falls, OH (US); Kyle Nelson, Wadsworth, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 276 days.

(21) Appl. No.: 18/163,693

(22) Filed: Feb. 2, 2023

(65) Prior Publication Data
US 2024/0030774 A1 Jan. 25, 2024

Related U.S. Application Data

(60) Provisional application No. 63/391,239, filed on Jul. 21, 2022.

(51) Int. Cl.
*H02K 9/19* (2006.01)
*H02K 5/20* (2006.01)
*B60K 11/02* (2006.01)

(52) U.S. Cl.
CPC ............... *H02K 5/203* (2021.01); *H02K 9/19* (2013.01); *B60K 11/02* (2013.01)

(58) Field of Classification Search
CPC ............ H02K 9/00; H02K 9/19; H02K 9/197; H02K 5/00; H02K 5/20; H02K 5/203
See application file for complete search history.

(56) References Cited

U.S. PATENT DOCUMENTS

2014/0062229 A1* 3/2014 Smetana .................. H02K 5/22
310/90

* cited by examiner

*Primary Examiner* — Tran N Nguyen
(74) *Attorney, Agent, or Firm* — Price Heneveld LLP

(57) ABSTRACT

An electric drive unit includes an electric motor having a rotor shaft that defines a hollow that is accessible via an opening defined at an axial end of the rotor shaft. The hollow defines a portion of a fluid flow path. The electric drive unit also includes an output shaft that extends into the hollow through the opening. The electric drive unit further includes a baffle that extends into the hollow through the opening. The baffle is arranged to redirect fluid flowing along the fluid flow path away from a portion of at least one of the rotor shaft and the output shaft.

19 Claims, 10 Drawing Sheets

ELECTRIC DRIVE UNIT THAT INCLUDES A BAFFLE

CROSS-REFERENCE TO RELATED APPLICATIONS

This application claims the benefit of priority under 35 U.S.C. § 119 of U.S. Provisional Application No. 63/391,239, filed on Jul. 21, 2022, the entire contents of which are incorporated herein by reference.

FIELD OF THE DISCLOSURE

The present disclosure relates generally to an electric drive unit. More specifically, the present disclosure relates to a fluid flow path and baffle for an electric drive unit.

BACKGROUND OF THE DISCLOSURE

In general, e-axles are intended for the smallest vehicle installation spaces. Heat dissipation out of the system is increasingly important because of the power density they achieve. For example, e-axles utilizing an asynchronous induction motor typically require active rotor cooling for function. As such, it is desirable to provide a way to accomplish the performance goals for cooling without adding significant costs, components, and complexity to the assembly.

SUMMARY OF THE DISCLOSURE

According to a first aspect of the present disclosure, an electric drive unit includes an electric motor having a rotor shaft that defines a hollow that is accessible via an opening defined at an axial end of the rotor shaft. The hollow defines a portion of a fluid flow path. The electric drive unit also includes an output shaft that extends into the hollow through the opening. The electric drive unit further includes a baffle that extends into the hollow through the opening. The baffle is arranged to redirect fluid flowing along the fluid flow path away from a portion of at least one of the rotor shaft and the output shaft.

Embodiments of the first aspect of the disclosure can include any one or a combination of the following features:
- a housing that houses the electric motor and has a passage formed therein, wherein the passage forms a portion of the fluid flow path, and fluid is configured to sequentially flow out of the passage, to the baffle, and into the hollow through the opening;
- the baffle is a sealing baffle that forms a seal between an inner surface of the housing and an outer surface of the output shaft;
- the baffle is a portion of a housing that houses the electric motor;
- the baffle includes an outer ring, an inner ring, and a connector ring that extends radially inboard from the outer ring to the inner ring;
- the connector ring slopes radially inboard and axially toward the hollow from the outer ring to the inner ring;
- at least a portion of the inner ring is positioned within the hollow, and the outer ring is positioned outside of the hollow;
- the rotor shaft includes an inner surface that defines the hollow, and a portion of the inner surface tapers radially outboard as the portion of the inner surface extends axially away from the axial end of the rotor shaft;
- the baffle is a first baffle and the electric drive unit further includes a second baffle, wherein the first baffle is arranged to redirect fluid flowing along the fluid flow path away from a portion of the output shaft, and the second baffle is arranged to redirect fluid flowing along the fluid flow path away from a portion of the rotor shaft;
- the second baffle is a portion of a housing that houses the electric motor, and the second baffle extends radially inboard from the housing, such that at least a portion of the second baffle is radially inboard of an outer surface of the rotor shaft at the axial end of the rotor shaft;
- the second baffle extends into the hollow through the opening; and
- the second baffle includes a first portion that is positioned between an inner surface of the rotor shaft and an outer surface of the output shaft and a second portion that is positioned between an outer surface of the rotor shaft and an inner surface of a housing that houses the electric motor.

According to a second aspect of the present disclosure, an electric drive unit includes a housing having a passage formed therein, an electric motor that is housed by the housing and that includes a rotor shaft that defines a hollow that is accessible via an opening defined at an axial end of the rotor shaft, an output shaft that extends into the hollow through the opening, and a baffle coupled to the housing and arranged to redirect fluid flowing out of the passage. The baffle is configured to redirect the fluid away from a portion of the output shaft and toward the opening.

Embodiments of the second aspect of the disclosure can include any one or a combination of the following features:
- the baffle includes an outer ring, an inner ring, and a connector ring that extends radially inboard from the outer ring to the inner ring, wherein the connector ring slopes radially inboard and axially toward the hollow from the outer ring to the inner ring;
- the passage forms a portion of a fluid flow path, and the fluid is configured to flow along the fluid flow path, sequentially, out of the passage through an outlet of the passage, to the baffle, and into the hollow through the opening, and wherein the connector ring is axially aligned with the outlet of the passage;
- the baffle is a first baffle, and the housing includes a second baffle that extends radially inboard such that at least a portion of the second baffle is radially inboard of an outer surface of the rotor shaft at the axial end of the rotor shaft;
- the second baffle extends through the opening into the hollow;
- the baffle extends through the opening into the hollow; and
- the rotor shaft includes an inner surface that defines the hollow, and a portion of the inner surface tapers radially outboard as the portion of the inner surface extends axially away from the axial end of the rotor shaft.

According to a third aspect of the present disclosure, an electric drive unit includes an electric motor having a rotor shaft that defines a hollow, an output shaft that extends into the hollow, and a baffle that extends into the hollow between the output shaft and the rotor shaft.

These and other features, advantages, and objects of the present disclosure will be further understood and appreciated by those skilled in the art by reference to the following specification, claims, and appended drawings.

DETAILED DESCRIPTION

Figure 1:
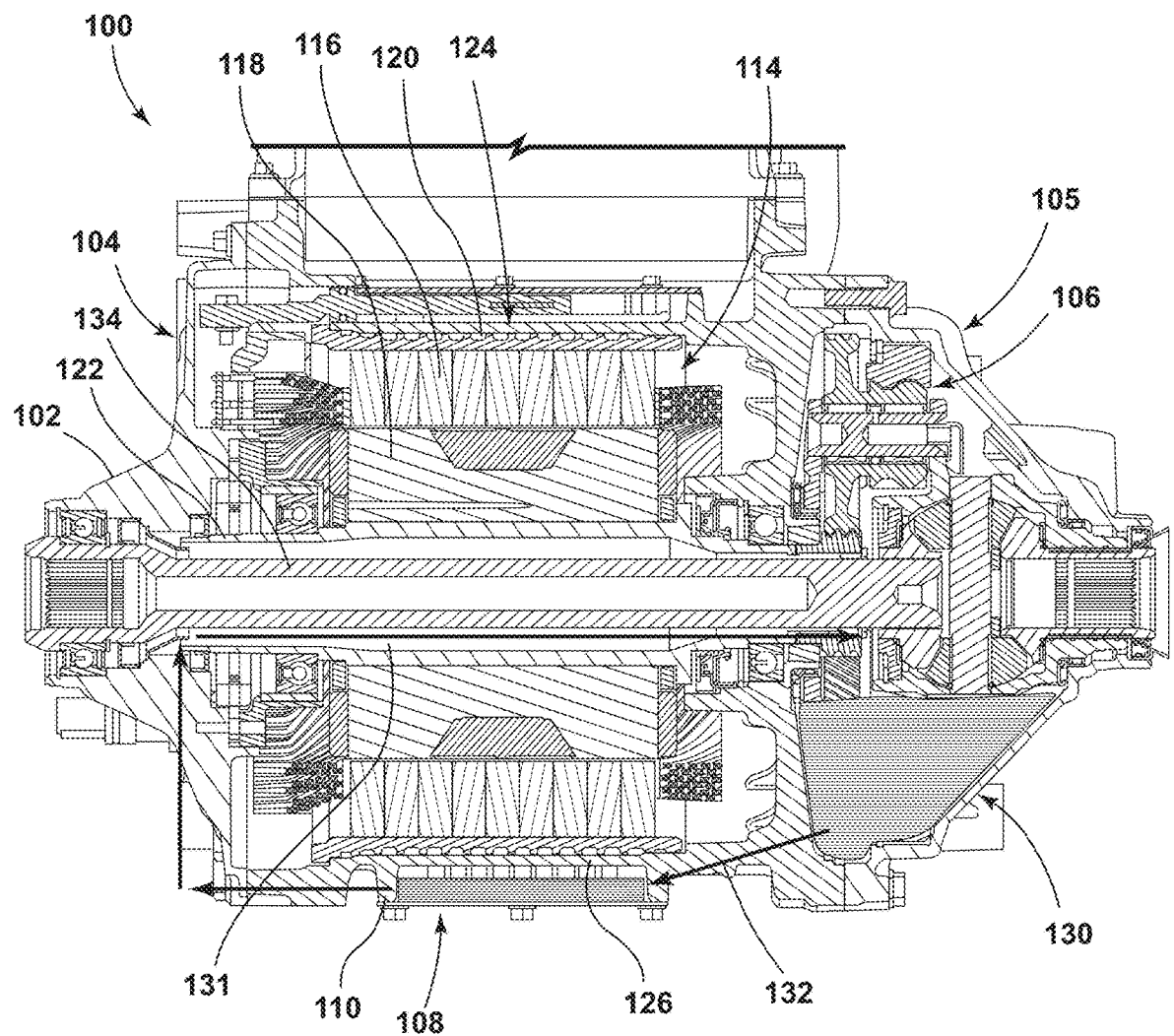
FIG. 1 shows a cross-sectional view of an electric drive unit including a fluid flow path and a baffle according to an embodiment of the present disclosure.

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "axial" and derivatives thereof, such as "axially," shall be understood to refer to a direction along the axis of a rotor shaft configured to rotate about the axis in operation of the apparatus described herein. Further, the term "radial" and derivatives thereof, such as "radially," shall be understood in relation to the axis of the aforementioned rotor shaft. For example, "radially outboard" refers to further away from the axis, while "radially inboard" refers to nearer to the axis.

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Embodiments according to this disclosure provide a fluid flow system for active rotor cooling. For active rotor cooling, a fluid (in this case oil, but potentially another medium) must be routed along a fluid flow path from a stationary system into a rotating shaft (the electric motor rotor shaft). Due to the low pressure of the fluid circuit, avoiding needless pressure reductions is desirable. Further, as the electric drive unit is a coaxial system, the fluid is exposed to both the high-speed rotor shaft and the output shaft, which could create a large drop in pressure due to the inertial force of the high-speed rotation. In the coaxial system, the fluid is delivered into a hollow defined by the rotor shaft that is also occupied by the rotating output shaft. This adds to the inertial force that creates back pressure in the system. The arrangement also significantly reduces the axial and radial space available for routing the fluid into the rotor shaft.

It is therefore advantageous for fluid being routed into the rotor shaft for cooling to be shielded from high-speed rotating parts. Without protection from these parts, the high-speed rotation could potentially pump the fluid backwards in the cooling circuit or slow the flow to a rate that is not acceptable for the necessary cooling of the electric motor rotor. Embodiments disclosed herein provide a fluid flow system where the fluid is guarded and/or pushed away from the rotating parts through use of one or more baffles.

Referring now to FIGS. 1-4, an electric drive unit 100 for a vehicle having a fluid flow system is provided, wherein the electric drive unit 100 is designed as an electric axle ("e-axle"). The electric drive unit 100 has a housing 102. The housing 102 can be functionally divided into a motor or center housing region 104 and a gear or gearbox housing region 105. In some embodiments, the housing 102 may be designed as a die-cast aluminum housing and may be formed in multiple parts. A gearbox 106 may include a planetary gearset, a differential, and a sump 130, for example. A heat exchanger 108 can be integrated, or integral with, the center housing region 104. That is, the existing planned casting process for the center housing region 104 may be used to form the heat exchanger 108. A fluid chamber 110 of the heat exchanger 108 may be formed in an outer surface (for example, by casting) of the center housing region 104. In some embodiments, the heat exchanger 108 may be located on the bottom of the electric drive unit 100. In some embodiments, the heat exchanger 108 may be located in another location, for example, on the top of the electric drive unit 100.

The electric drive unit 100 also includes an electric motor 114 having a stator 116, a rotor 118, a stator carrier 120, and a rotor shaft 122. The stator 116 also includes a fluid jacket 124 formed, and bounded, by the stator carrier 120 and a fluid chamber bottom wall 126 of the fluid chamber 110. In this way, the stator carrier 120 forms an inner wall or portion of the stator fluid jacket 124 and the fluid chamber bottom wall 126 forms an outer wall or portion of the stator fluid jacket 124. The cavity formed therebetween may be filled with a fluid, such as a water-glycol mixture, for example, for cooling of the stator 116 and another fluid, such as oil, that is disposed within the fluid chamber 110 of the heat exchanger 108. In this arrangement, the heat exchanger 108 uses the existing cool walls of the stator fluid jacket 124 to cool fluid within the fluid chamber 110. That is, the fluid chamber bottom wall 126 is in contact with the stator fluid jacket 124 volume on an inner surface and is in contact with the fluid from the heat exchanger 108 on an outer surface and functions as a "cool wall". This further allows heat exchanging of fluid without added fluid pressure losses or the addition of additional fluid circuits. In various embodiments, the cavity defined by the stator fluid jacket 124 can be filled with a water-glycol mixture, such that the stator fluid jacket 124 is a water fluid jacket 124, and the fluid chamber 110 of the heat exchanger 108 can be filled with oil, such that the fluid chamber 110 is an oil chamber 110. It is contemplated that a variety of different types of fluids can be utilized within the cavity defined by the stator fluid jacket 124 and the fluid chamber 110.

In operation of an exemplary embodiment, the gearbox 106 collects and distributes (via splashing from rotating components of the gearbox 106) oil from the gearbox sump 130 to the heat exchanger 108. The heat exchanger 108 cools the oil with water that is disposed on the opposing side of the fluid chamber bottom wall 126 within the stator fluid jacket 124. The cooled oil is then routed to the rotor shaft 122 along a fluid flow path 131 of a fluid circuit 132 in the housing 102 to provide active rotor cooling. Fluid, such as oil as described herein, may be routed along the fluid flow path 131 to the rotor shaft 122 via a passage 136 formed in the housing 102. The passage 136 includes an end with an outlet 138 that is in fluid communication with the rotor shaft 122 such that fluid flowing through the passage 136 exits the outlet 138 and subsequently flows into rotor shaft 122.

Figure 2:
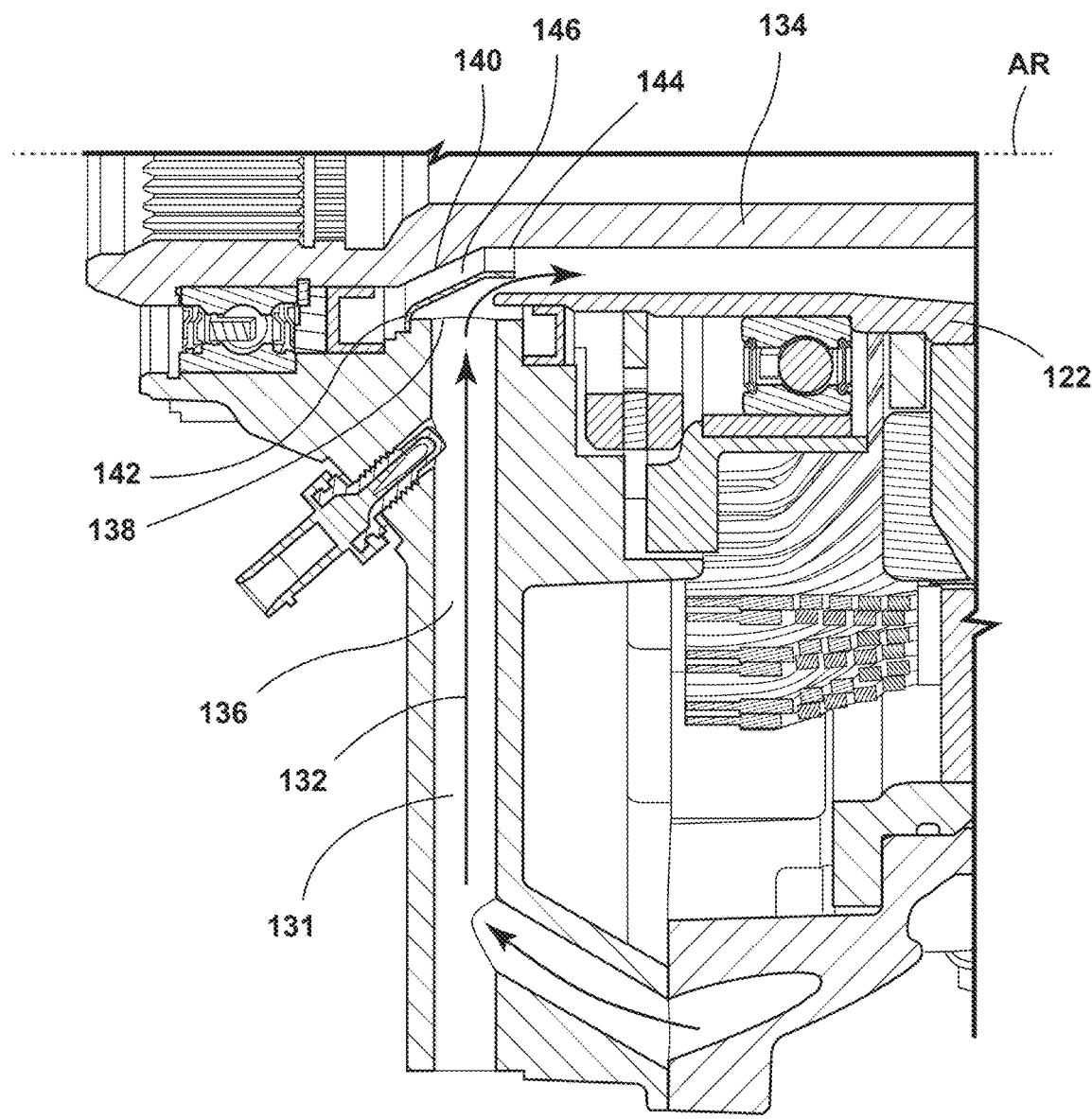
FIG. 2 shows an enlarged cross-sectional view of the fluid flow path and the baffle of the electric drive unit of FIG. 1.

To protect fluid in the fluid circuit 132 flowing through the passage 136 and the outlet 138 into the rotor shaft 122 from back pressure, a baffle 140 may be disposed proximate to the rotor shaft 122. In some embodiments, a portion of the baffle 140 can be arranged inside of the rotor shaft 122 between an inner surface 152 of rotor shaft 122 and an outer surface 158 of an output shaft 134. As illustrated in FIG. 1, the rotor shaft 122 includes an opening 149 at an axial end 151 of the rotor shaft 122 that is axially distal from the gearbox 106. The output shaft 134 extends through the opening 149 into a hollow 153 defined by the inner surface 152 of the rotor shaft 122 to the gearbox 106, wherein the output shaft 134 is engaged with the differential of the gearbox 106. The fluid flow path 131 may be at least a portion of the fluid circuit 132. For example, in the embodiment illustrated in FIG. 1, the passage 136 formed in the housing 102 and the hollow 153 defined by the rotor shaft 122 are portions of the fluid flow path 131. As illustrated in FIG. 2, in some implementations, the fluid flowing along the fluid flow path 131 is configured to sequentially flow out of the passage 136 through the outlet 138, to the baffle 140, and into the hollow 153 through the opening 149.

Figure 3:
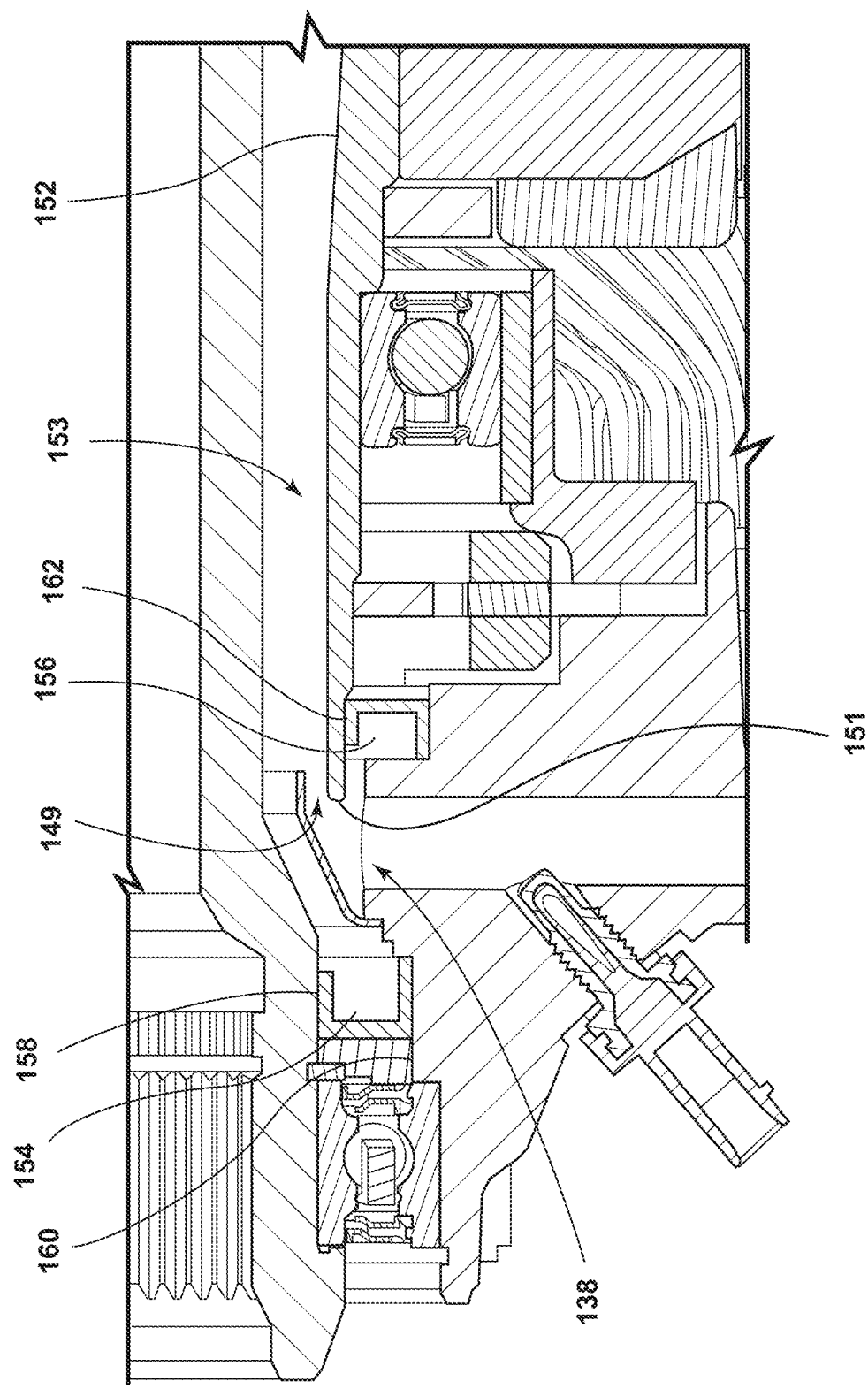
FIG. 3 shows another enlarged cross-sectional view of the fluid flow path and the baffle of the electric drive unit of FIG. 1.
Figure 4:
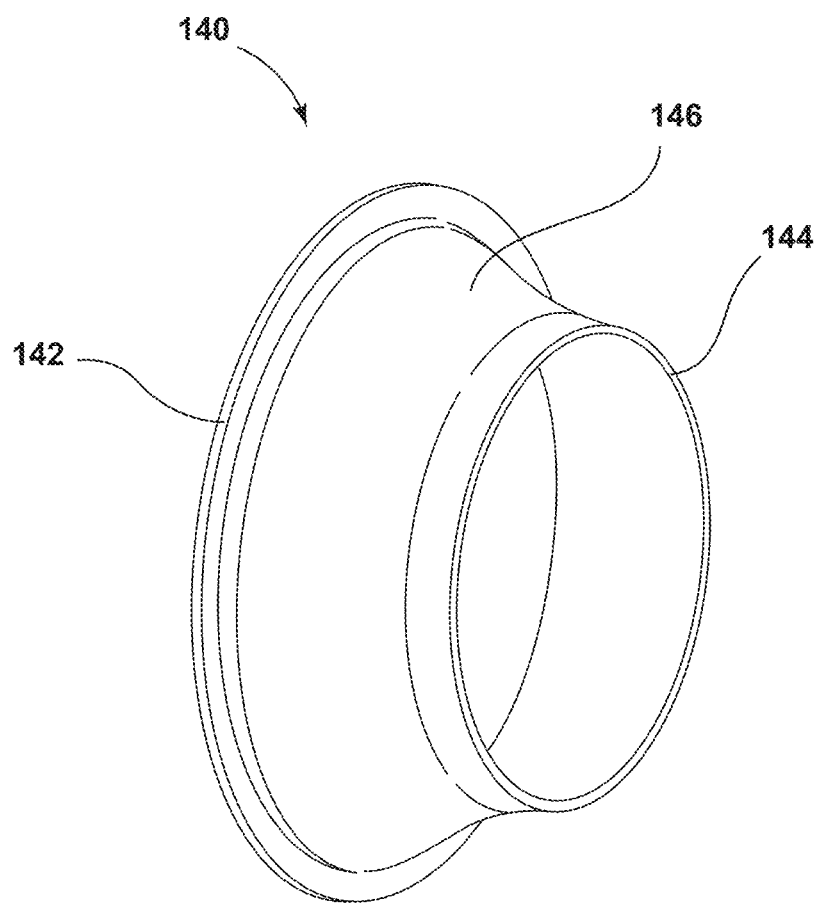
FIG. 4 shows a perspective view of the baffle of the electric drive unit shown in FIG. 1.

Referring still to FIGS. 1-4, the baffle 140 extends circumferentially about the outer surface 158 of the output shaft 134, in various embodiments. As illustrated in FIG. 4, the baffle 140 includes an outer ring 142, an inner ring 144 and a connector ring 146 extending between the outer ring 142 and the inner ring 144 and connected therewith (e.g., see FIG. 4). The connector ring 146 includes an annular surface that extends at a slope or angle radially inboard and axially from the outer ring 142 to the inner ring 144. As illustrated in FIGS. 1 and 2, the connector ring 146 extends radially inboard and axially toward the hollow 153 from the outer ring 142 to the inner ring 144. In some examples, the outer ring 142 may be fixed to the housing 102 via staking. The baffle 140 is arranged to be axially aligned with the passage 136 formed in the housing 102 such that fluid passing through the outlet 138 contacts the baffle 140 and is guided into the opening 149 of the rotor shaft 122. In various embodiments, the surface of the baffle 140 that is aligned with the outlet 138 of the passage 136 is angled relative to the flow direction of the fluid exiting the outlet 138, such that the fluid is turned by the baffle 140 into the rotor shaft 122 about 90 degrees. As illustrated in FIG. 2, the fluid can be gradually turned about 90 degrees. The gradual turning of the fluid may advantageously reduce pressure drop compared to a system in which fluid flows directly to the outer surface 158 of the output shaft 134 from the outlet 138. The baffle 140, and in particular the sloped connector ring 146, guides fluid entering from the passage 136 along the inner surface 152 of the rotor shaft 122.

The baffle 140 further acts as a guard to prevent fluid from immediately hitting or contacting the outer surface 158 of the output shaft 134 that is rotating, which could cause undesirable pressure drop. In various embodiments, the baffle 140 is coupled to the housing 102 and is arranged to redirect fluid flowing along the fluid flow path 131 away from a portion of at least one of the rotor shaft 122 and the output shaft 134. For example, as illustrated in FIG. 2, the baffle 140 is coupled to the housing 102 and arranged to redirect fluid flowing out of the outlet 138 of the passage 136 away from a portion of the output shaft 134 and toward the opening 149 of the rotor shaft 122.

Referring now to FIGS. 1-3, the inner surface 152 of rotor shaft 122 may have a tapered profile in order to flow the fluid away from the outlet 138 and the opening 149 at the axial end 151 of the rotor shaft 122 using inertial force. As fluid flows through the rotor shaft 122 along the inner surface 152, the rotor shaft 122 is cooled by the fluid from the fluid circuit 132. The tapered shape or profile of the inner surface 152 of the rotor shaft 122 pumps the fluid using centrifugal force. In the embodiment shown in FIGS. 1-3, fluid will be pumped left to right (toward the gearbox 106). In various embodiments, a portion of the inner surface 152 of the rotor shaft 122 tapers radially outboard as the portion of the inner surface 152 extends axially away from the axial end 151 of the rotor shaft 122. As illustrated in FIG. 1, a majority of the inner surface 152 of the rotor shaft 122 tapers radially outboard as the inner surface 152 extends axially away from the axial end 151 of the rotor shaft 122.

Seals may be provided to seal fluid entering the rotor shaft 122 from leaking out into the environment and surrounding structure of the electric drive unit 100. For example, a first seal 154 may be arranged between the outer surface 158 of the output shaft 134 and an inner surface 160 of the housing 102 to seal fluid from the environment on a first axial side of the baffle 140 and the passage 136. The first seal 154 may be a lip seal and arranged adjacent to the outer ring 142 of the baffle 140, as illustrated in FIGS. 1-3. A second seal 156 may be arranged radially between an outer surface 162 of the rotor shaft 122 and the inner surface 160 of the housing 102 to seal fluid from the environment on a second side of the passage 136. The first and second seals 154, 156 act to seal both axial sides of the fluid circuit 132 as fluid travels from the passage 136 to the rotor shaft 122.

In operation, the baffle 140 may be used to guard and shield the fluid entering the rotor shaft 122 via the outlet 138 from rotating parts (e.g., the output shaft 134) until the fluid enters the spinning rotor shaft 122. By keeping the fluid off of the rotating components (e.g., the output shaft 134) and designing the connector ring 146 of the baffle 140 to have a gradual turn or slope rather than a sharp corner, the pressure drop is reduced. Additionally, the inner surface 152 of the rotor shaft 122 being tapered advantageously delivers the fluid away from the opening 149 using inertial force. As illustrated in FIGS. 1 and 2, a portion of the inner surface 152 of the rotor shaft 122 tapers radially outboard as the inner surface 152 extends axially away from the opening 149 of the rotor shaft 122.

Figure 5:
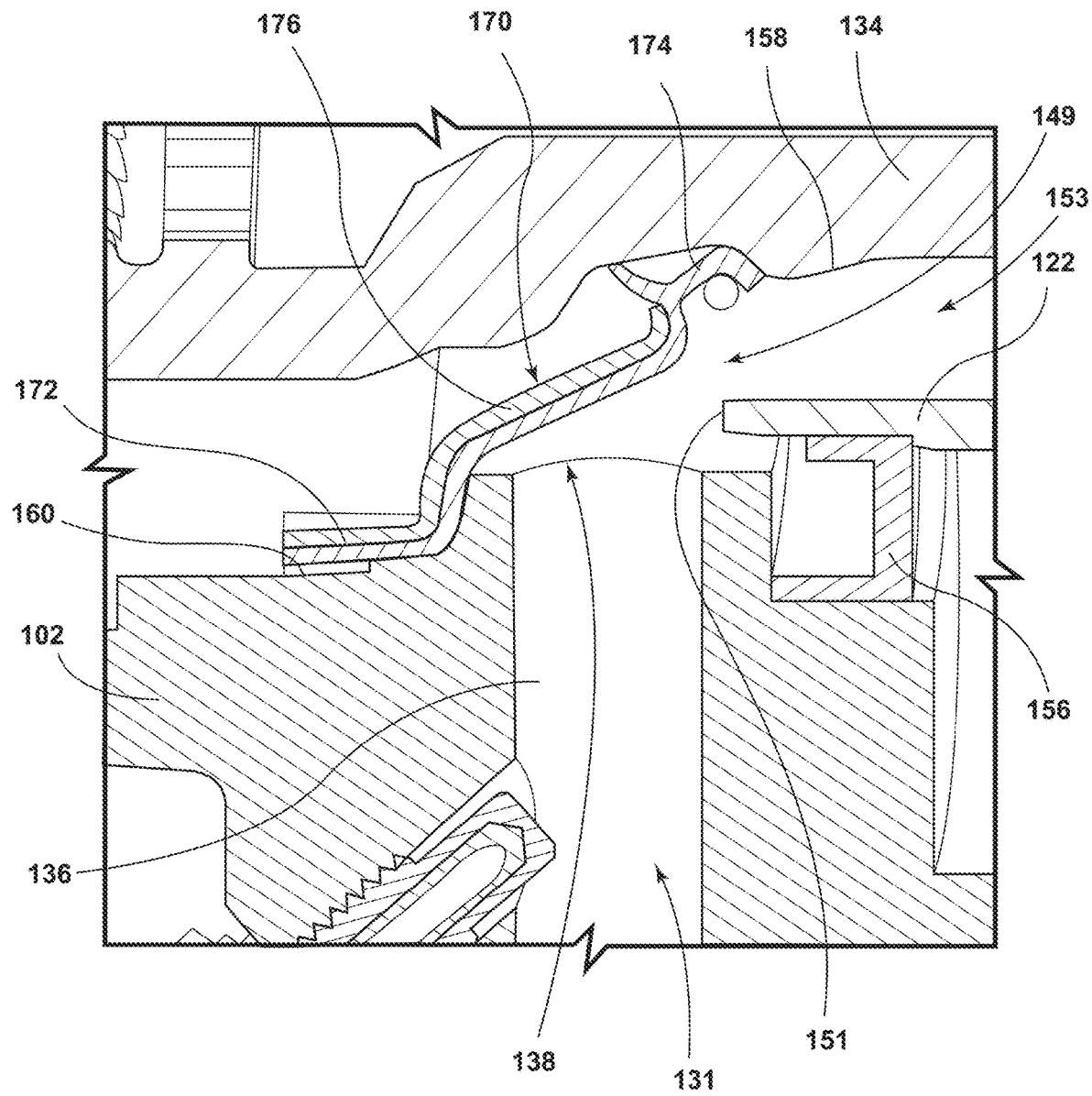
FIG. 5 shows a cross-sectional view of a portion of an embodiment of the electric drive unit that includes a fluid flow path and a metal bonded sealing baffle.

Referring now to FIG. 5, in some embodiments, the baffle 140 can be utilized as a seal. For example, as illustrated in FIG. 5, the baffle 140 is a metal bonded sealing baffle 170 that allows omission of the first seal 154 (shown in FIGS. 1-4). In the embodiment illustrated in FIG. 5, the sealing baffle 170 includes an outer ring 172, an inner ring 174 and a connector ring 176 extending between the outer ring 172 and the inner ring 174 and connected therewith. The outer ring 172 is arranged to seal against the inner surface 160 of the housing 102, thereby incorporating the functionality of the omitted first seal 154 into the sealing baffle 170. The inner ring 174 is sealed against the outer surface 158 of the output shaft 134. The inner ring 174 may be sealed with a lip seal, for example. The connector ring 176 may be pressed against the outer surface 158 of the output shaft 134. The connector ring 176 extends at a slope or angle radially inboard and axially from the outer ring 172 to the inner ring 174. In various embodiments, the surface of the sealing baffle 170 that is aligned with the outlet 138 of the passage 136 is angled relative to the flow direction of the fluid exiting the outlet 138, such that the fluid is turned by the sealing baffle 170 (particularly, the connector ring 176) into the rotor shaft 122 about 90 degrees. The fluid can be gradually turned about 90 degrees. The gradual redirection of the fluid may advantageously reduce pressure drop compared to a system in which fluid flows directly to the outer surface 158 of the output shaft 134 from the outlet 138. The sealing baffle 170 further acts as a guard to prevent fluid from immediately hitting or contacting the outer surface 158 of the output shaft 134 that is rotating, which could cause undesirable pressure drop. Advantages of the sealing baffle 170 embodiment of the baffle 140 can include using fewer components (e.g., eliminating a separate seal component) and saving axial space.

Figure 6:
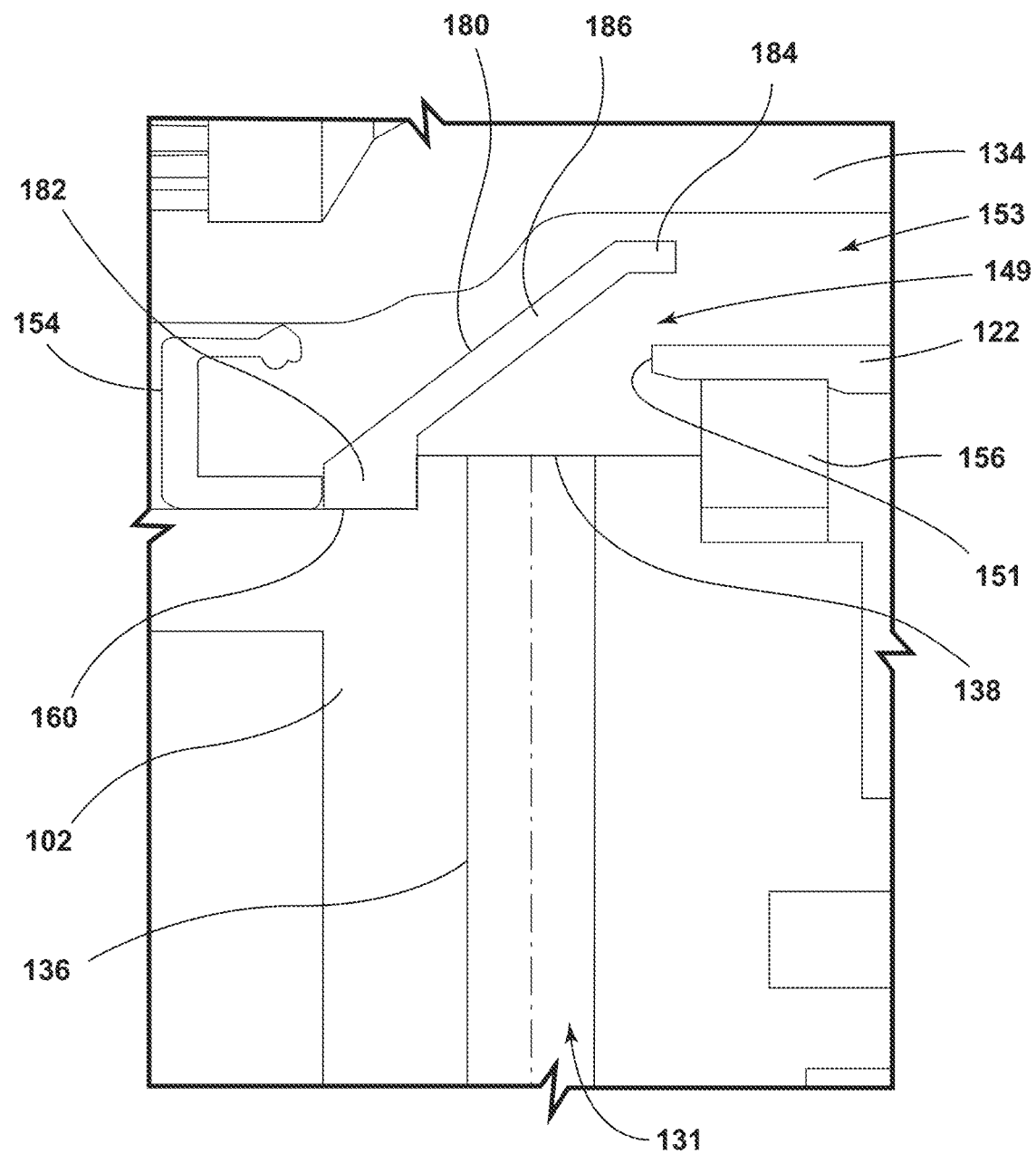
FIG. 6 shows a cross-sectional view of a portion of an embodiment of the electric drive unit that includes a molded (e.g., cast, injection, etc.) baffle that is press-fit into a housing of the electric drive unit.

Referring now to FIG. 6, in some embodiments, the baffle 140 can be a molded baffle 180, such as a cast molded baffle 180 or an injection molded baffle 180. As illustrated in FIG. 6, the molded baffle 180 is press-fit into the inner surface 160 of the housing 102. The molded baffle 180 includes an outer ring 182, an inner ring 184, and a connector ring 186 extending between the outer ring 182 and the inner ring 184 and connected therewith. The connector ring 186 extends at a slope or angle radially inboard and axially from the outer ring 182 to the inner ring 184. In various embodiments, the surface of the molded baffle 180 that is aligned with the outlet 138 of the passage 136 (e.g., the surface of the connector ring 186) is angled relative to the flow direction of the fluid exiting the outlet 138, such that the fluid is turned by the molded baffle 180 into the rotor shaft 122 about 90 degrees. The fluid can be gradually turned about 90 degrees. The gradual turning of the fluid may advantageously reduce pressure drop compared to a system in which fluid flows directly to the outer surface 158 of the output shaft 134 from the outlet 138. The molded baffle 180 further acts as a guard to prevent fluid from immediately hitting or contacting the outer surface 158 of the output shaft 134 that is rotating, which could cause an undesirable pressure drop. The outer ring 182 of the molded baffle 180 may be pressed into the inner surface 160 of the housing 102 and may be arranged to abut and act as a shoulder for the first seal 154, in some implementations, as illustrated in FIG. 6.

Figure 7A:
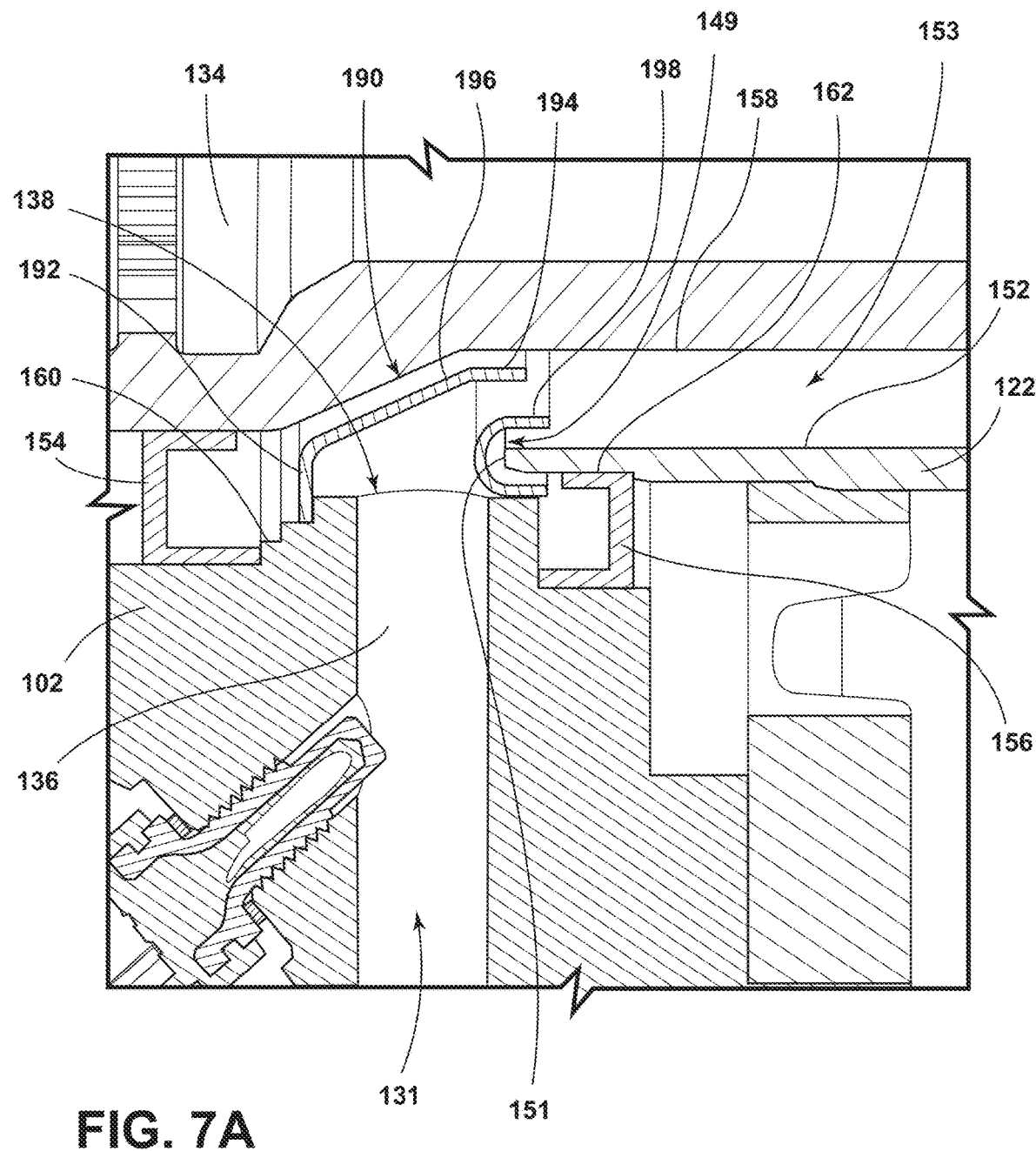
FIG. 7A shows a cross-sectional view of a portion of an embodiment of the electric drive unit that includes a fluid flow path, a first baffle, and a second baffle.

Referring now to FIG. 7A, in some embodiments, the electric drive unit 100 can include a plurality of baffles 140. For example, as illustrated in FIG. 7A, the electric drive unit 100 includes a first baffle 190 and a second baffle 198. The first baffle 190 is arranged inside the rotor shaft 122 and includes an outer ring 192, an inner ring 194, and a connector ring 196 extending between the outer ring 192 and the inner ring 194 and connected therewith. The outer ring 192 may be fixed to the inner surface 160 of the housing 102 by, for example, staking on one axial side of the passage 136. The connector ring 196 includes an annular surface that extends at a slope or angle radially inboard and axially from the outer ring 192 to the inner ring 194. The second baffle 198 may be provided to further reduce back pressure by shielding fluid from the effects of the rotating rotor shaft 122. The second baffle 198 may be of C-shaped design where a first portion of the second baffle 198 is arranged between the inner surface 152 of the rotor shaft 122 and the outer surface 158 of the output shaft 134 and a second portion of the second baffle 198 is arranged between the outer surface 162 of the rotor shaft 122 and the inner surface 160 of the housing 102. As illustrated in FIG. 7A, the second baffle 198 generally wraps about a portion of the rotor shaft 122 that extends between the inner surface 152 of the rotor shaft 122 and the outer surface 162 of the rotor shaft 122 at the axial end 151 of the rotor shaft 122. The second baffle 198 may be formed by a variety of methods, such as stamping or injection molding, and may be press-fit or staked to the housing 102.

The first baffle 190 is arranged to be axially aligned with the passage 136 formed in the housing 102 such that fluid passing through the outlet 138 contacts the first baffle 190 and is guided on a gradual 90 degree (or substantially/about 90 degree) turn to reduce pressure drop. Fluid is further guided between the inner ring 194 of the first baffle 190 and the second baffle 198 toward the rotor shaft 122. The first and second seals 154, 156 may be provided to seal fluid entering the rotor shaft 122 from leaking out into the environment and surrounding structure of the electric drive unit 100. The first seal 154 may be arranged between the outer surface 158 of the output shaft 134 and the inner surface 160 of the housing 102 to seal fluid from the environment on the first axial side of the first baffle 190, the second baffle 198, and the outlet 138 that is axially distal from the gearbox 106. The first seal 154 may be a lip seal and arranged adjacent to the outer ring 192 of the first baffle 190. The second seal 156 may be arranged between the outer surface 162 of the rotor shaft 122 and the inner surface 160 of the housing 102 to seal fluid from the environment of the electric drive unit 100 on the second axial side of the first baffle 190, the second baffle 198, and the outlet 138. The first and second seals 154, 156 are configured to cooperate to seal both axial sides of the passage 136.

Figure 7B:
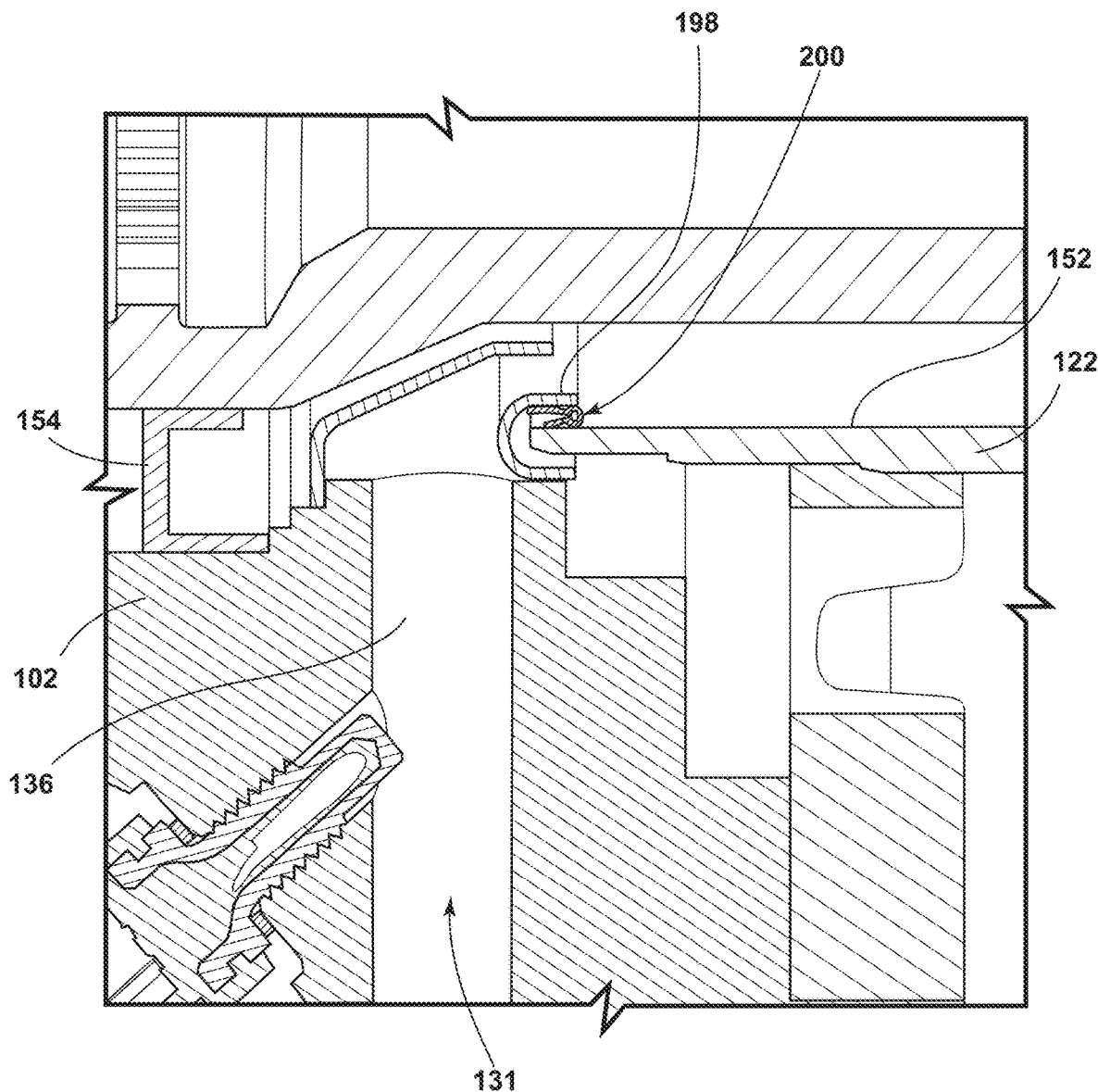
FIG. 7B shows a cross-sectional view of a portion of an embodiment of the electric drive unit that includes a fluid flow path, a first baffle, a second baffle, and a seal positioned between the second baffle and an inner surface of a rotor shaft of the electric drive unit.

Referring now to FIG. 7B, in some embodiments of the electric drive unit 100 that include the first and second baffles 190, 198, a seal 200 may extend radially between the second baffle 198 and the rotor shaft 122. For example, as illustrated in FIG. 7B, the seal 200 extends between the inner surface 152 of the rotor shaft 122 and the first portion of the second baffle 198 that is arranged between the inner surface 152 of the rotor shaft 122 and the outer surface 158 of the output shaft 134. In the illustrated embodiment, the second seal 156 that is disposed radially between the inner surface 160 of the housing 102 and the outer surface 162 of the rotor shaft 122, as illustrated in FIGS. 1-3, is omitted. Advantages of the embodiment illustrated in FIG. 7B can include using fewer components (e.g., eliminating a separate seal component) and saving axial space.

Figure 8:
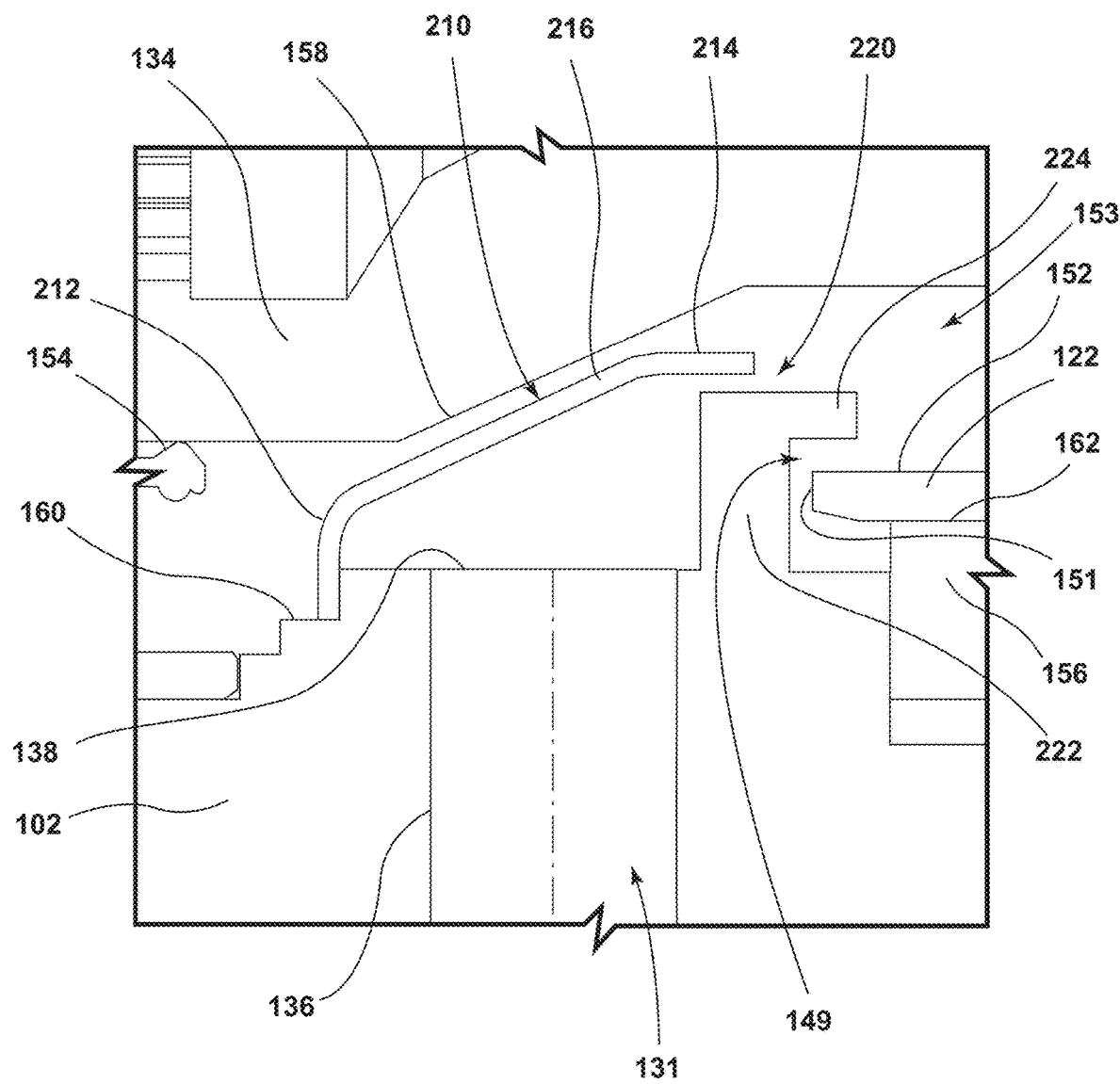
FIG. 8 shows a cross-sectional view of a portion of an embodiment of the electric drive unit that includes a first baffle and a second baffle that is a portion of a housing of the electric drive unit.
Figure 9:
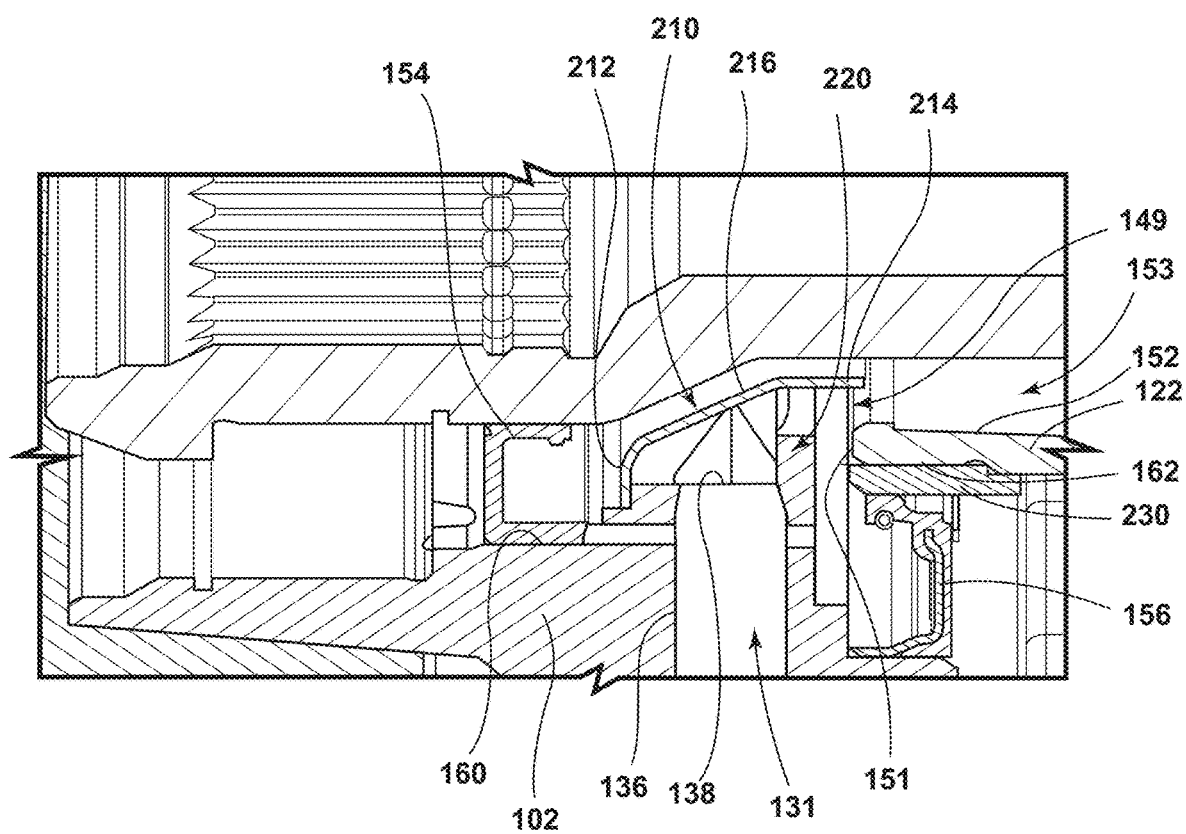
FIG. 9 shows a cross-sectional view of a portion of an embodiment of the electric drive unit that includes a first baffle and a second baffle that is a portion of a housing of the electric drive unit.

Referring now to FIGS. 8 and 9, in some embodiments, the housing 102 includes a baffle 220. In other words, the baffle 220 can be a portion of the housing 102. The baffle 220 of the housing 102 extends radially inboard from adjacent portions of the housing 102 and may be configured to direct the flow of fluid into the rotor shaft 122 through the opening 149. In the embodiment illustrated in FIG. 8, the electric drive unit 100 includes a first baffle 210 and a second baffle 220 that is the baffle 220 of the housing 102. The first baffle 210 includes an outer ring 212, an inner ring 214, and a connector ring 216 extending between the outer ring 212 and the inner ring 214 and connected therewith. The outer ring 212 may be fixed to the inner surface 160 of the housing 102 by, for example, staking on one axial side of the passage 136. The connector ring 216 includes an annular surface that extends at a slope or angle radially inboard and axially from the outer ring 212 to the inner ring 214.

The second baffle 220 of the housing 102 may be provided to further reduce back pressure by shielding fluid from the effects of the rotating rotor shaft 122. The second baffle 220 of the housing 102 may be cast and formed in the housing 102. As illustrated in FIG. 8, the second baffle 220 includes a radially inboard-extending portion 222 that extends radially inboard from adjacent portions of the housing 102. The radially inboard-extending portion 222 can extend radially inboard such that at least a portion of the second baffle 220 is disposed radially inboard of the outer surface 162 of the rotor shaft 122 at the axial end 151 of the rotor shaft 122. As illustrated in FIG. 8, the radially inboard-extending portion 222 extends radially inboard such that at least a portion of the second baffle 220 is disposed radially inboard of the inner surface 152 of the rotor shaft 122 at the axial end 151 of the rotor shaft 122. The second baffle 220 can include an axially-extending portion 224. As illustrated in FIG. 8, the axially-extending portion 224 extends in an axial direction from the radially inboard-extending portion 222. The axially-extending portion 224 extends between outer surface 158 of output shaft 134 and inner surface 152 of the rotor shaft 122 through the opening 149 into the hollow 153.

The first baffle 210 is arranged to be axially aligned with the outlet 138 of the passage 136 formed in housing 102 such that fluid passing through outlet 138 contacts the first baffle 210 and is guided on a gradual 90 degree (or substantially/about 90 degree) turn to reduce pressure drop. The fluid is further guided between the inner ring 214 of the first baffle 210 and the axially extending portion 224 of the second baffle 220 toward the hollow 153 of the rotor shaft 122. In some implementations, the first and second seals 154, 156 may be provided to seal fluid entering the rotor shaft 122 from leaking out into the environment and surrounding structure of the electric drive unit 100. The first seal 154 may be arranged between the outer surface 158 of the output shaft 134 and the inner surface 160 of the housing 102 to seal fluid from the environment on a first axial side of the first baffle 210. The first seal 154 may be a lip seal and arranged adjacent to the outer ring 212 of the first baffle 210. The second seal 156 may be arranged between the outer surface 162 of the rotor shaft 122 and the inner surface 160 of the housing 102 to seal fluid from the environment of the electric drive unit 100 on a second side of the passage 136. In some embodiments, a seal may be arranged between the axially extending portion 224 and the inner surface 152 of the rotor shaft 122, thereby eliminating the second seal 156. Advantages to this embodiment include using fewer components and further reducing fluid pressure drop by shielding the fluid from the effects of both rotating components (i.e., the output shaft 134 and rotor shaft 122).

In the embodiment illustrated in FIG. 9, electric drive unit 100 includes the first baffle 210 and the second baffle 220 that is a portion of the housing 102. The first baffle 210 includes the outer ring 212, the inner ring 214, and the connector ring 216. The connector ring 216 slopes radially inboard and axially toward the hollow 153 from the outer ring 212 to the inner ring 214. The second baffle 220 extends radially inboard from the housing 102, such that at least a portion of the second baffle 220 is radially inboard of the outer surface 162 of the rotor shaft 122 at the axial end 151 of the rotor shaft 122. As illustrated in FIG. 9, the radially-inboard-most portion of the second baffle 220 is positioned radially between the inner surface 152 of the rotor shaft 122 and the outer surface 162 of the rotor shaft 122 at the axial end 151 of the rotor shaft 122.

In the embodiment illustrated in FIG. 9, the first seal 154 extends between the outer surface 158 of the output shaft 134 and the inner surface 160 of the housing 102. Further, the second seal 156 is positioned between the inner surface 160 of the housing 102 and the outer surface 162 of the rotor shaft 122. As illustrated in FIG. 9, the electric drive unit 100 includes an annular sleeve 230 that extends circumferentially along the outer surface 162 of the rotor shaft 122 proximate to the axial end 151 of the rotor shaft 122. The second seal 156 extends radially between the inner surface 160 of the housing 102 and the annular sleeve 230 in the illustrated embodiment. In operation of the embodiment illustrated in FIG. 9, fluid is delivered out of the passage 136 through the outlet 138. The fluid is then guided into hollow 153 of the rotor shaft 122 by the first and second baffles 210, 220, which are configured to prevent the fluid exiting the outlet 138 from immediately contacting the rotating rotor shaft 122 and the rotating output shaft 134.

Embodiments according to the present disclosure provide several advantages. For example, one or more baffles of the electric drive unit 100 described herein may advantageously reduce pressure drops in the fluid circuit 132, initially shielding fluid exiting the outlet 138 of the passage 136 from rotating components (e.g., the output shaft 134 and the rotor shaft 122) of the electric drive unit 100. Further, connector ring 146 of the baffle 140 being sloped radially inboard and axially toward the gearbox 106 may cause fluid flowing radially inboard through the outlet 138 to gradually turn about 90 degrees toward the hollow 153 defined by the rotor shaft 122. This gradual turning of the fluid may prevent drops in pressure that would occur in a system where fluid flows to a rotating output shaft.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to, cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

It is to be understood that variations and modifications can be made on the aforementioned structure without departing from the concepts of the present disclosure, and further it is to be understood that such concepts are intended to be covered by the following claims unless these claims by their language expressly state otherwise.

LIST OF REFERENCE NUMERALS

Electric drive unit 100
Housing 102
Center housing region 104
Gearbox housing region 105
Gearbox 106
Heat exchanger 108
Fluid chamber 110
Electric motor 114
Stator 116
Rotor 118
Stator carrier 120
Rotor shaft 122
Stator fluid jacket 124
Fluid chamber bottom wall 126
Sump 130
Fluid flow path 131
Fluid circuit 132
Output shaft 134
Passage 136
Outlet 138
Baffle 140
Outer ring (of the baffle) 142
Inner ring (of the baffle) 144
Connector ring (of the baffle) 146
Opening 149
Axial end 151
Inner surface (of the rotor shaft) 152
Hollow 153
First seal 154
Second seal 156
Outer surface (of the output shaft) 158
Inner surface (of the housing) 160
Outer surface (of the rotor shaft) 162
Sealing baffle 170
Outer ring (of the sealing baffle) 172
Inner ring (of the sealing baffle) 174
Connector ring (of the sealing baffle) 176
Molded baffle 180
Outer ring (of the molded baffle) 182
Inner ring (of the molded baffle) 184
Connector ring (of the molded baffle) 186
First baffle 190
Outer ring (of the first baffle) 192
Inner ring (of the first baffle) 194
Connector ring (of the first baffle) 196
Second baffle 198
Seal 200
First baffle 210
Outer ring (of the first baffle) 212
Inner ring (of the first baffle) 214
Connector ring (of the first baffle) 216
Baffle/Second baffle 220
Radially inboard-extending portion 222
Axially-extending portion 224
Annular sleeve 230

What is claimed is:

1. An electric drive unit, comprising:
an electric motor having a rotor shaft that defines a hollow that is accessible via an opening defined at an axial end of the rotor shaft, wherein the hollow defines a portion of a fluid flow path;

an output shaft that extends into the hollow through the opening; and a baffle that extends into the hollow through the opening, wherein the baffle is arranged to redirect fluid flowing along the fluid flow path away from a portion of at least one of the rotor shaft and the output shaft.

2. The electric drive unit of claim 1, further comprising: a housing that houses the electric motor and has a passage formed therein, wherein the passage forms a portion of the fluid flow path, and fluid is configured to sequentially flow out of the passage, to the baffle, and into the hollow through the opening.

3. The electric drive unit of claim 2, wherein the baffle is a sealing baffle that forms a seal between an inner surface of the housing and an outer surface of the output shaft.

4. The electric drive unit of claim 1, wherein the baffle is a portion of a housing that houses the electric motor.

5. The electric drive unit of claim 1, wherein the baffle includes an outer ring, an inner ring, and a connector ring that extends radially inboard from the outer ring to the inner ring.

6. The electric drive unit of claim 5, wherein the connector ring slopes radially inboard and axially toward the hollow from the outer ring to the inner ring.

7. The electric drive unit of claim 5, wherein at least a portion of the inner ring is positioned within the hollow, and the outer ring is positioned outside of the hollow.

8. The electric drive unit of claim 1, wherein the rotor shaft includes an inner surface that defines the hollow, and wherein a portion of the inner surface tapers radially outboard as the portion of the inner surface extends axially away from the axial end of the rotor shaft.

9. The electric drive unit of claim 1, wherein the baffle is a first baffle and the electric drive unit further comprises:
a second baffle, wherein the first baffle is arranged to redirect fluid flowing along the fluid flow path away from a portion of the output shaft, and the second baffle is arranged to redirect fluid flowing along the fluid flow path away from a portion of the rotor shaft.

10. The electric drive unit of claim 9, wherein the second baffle is a portion of a housing that houses the electric motor, and wherein the second baffle extends radially inboard from the housing, such that at least a portion of the second baffle is radially inboard of an outer surface of the rotor shaft at the axial end of the rotor shaft.

11. The electric drive unit of claim 10, wherein the second baffle extends into the hollow through the opening.

12. The electric drive unit of claim 9, wherein the second baffle includes a first portion that is positioned between an inner surface of the rotor shaft and an outer surface of the output shaft and a second portion that is positioned between an outer surface of the rotor shaft and an inner surface of a housing that houses the electric motor.

13. An electric drive unit, comprising:
a housing having a passage formed therein;
an electric motor that is housed by the housing and that includes a rotor shaft that defines a hollow that is accessible via an opening defined at an axial end of the rotor shaft;
an output shaft that extends into the hollow through the opening; and
a baffle coupled to the housing and arranged to redirect fluid flowing out of the passage, wherein the baffle is configured to redirect the fluid away from a portion of the output shaft and toward the opening.

14. The electric drive unit of claim 13, wherein the baffle includes an outer ring, an inner ring, and a connector ring that extends radially inboard from the outer ring to the inner ring, wherein the connector ring slopes radially inboard and axially toward the hollow from the outer ring to the inner ring.

15. The electric drive unit of claim 14, wherein the passage forms a portion of a fluid flow path, and the fluid is configured to flow along the fluid flow path, sequentially, out of the passage through an outlet of the passage, to the baffle, and into the hollow through the opening, and wherein the connector ring is axially aligned with the outlet of the passage.

16. The electric drive unit of claim 15, wherein the baffle is a first baffle, and the housing comprises:
a second baffle that extends radially inboard such that at least a portion of the second baffle is radially inboard of an outer surface of the rotor shaft at the axial end of the rotor shaft.

17. The electric drive unit of claim 16, wherein the second baffle extends through the opening into the hollow.

18. The electric drive unit of claim 13, wherein the baffle extends through the opening into the hollow.

19. The electric drive unit of claim 13, wherein the rotor shaft includes an inner surface that defines the hollow, and wherein a portion of the inner surface tapers radially outboard as the portion of the inner surface extends axially away from the axial end of the rotor shaft.

* * * * *